United States Patent Office 3,311,749
Patented Mar. 28, 1967

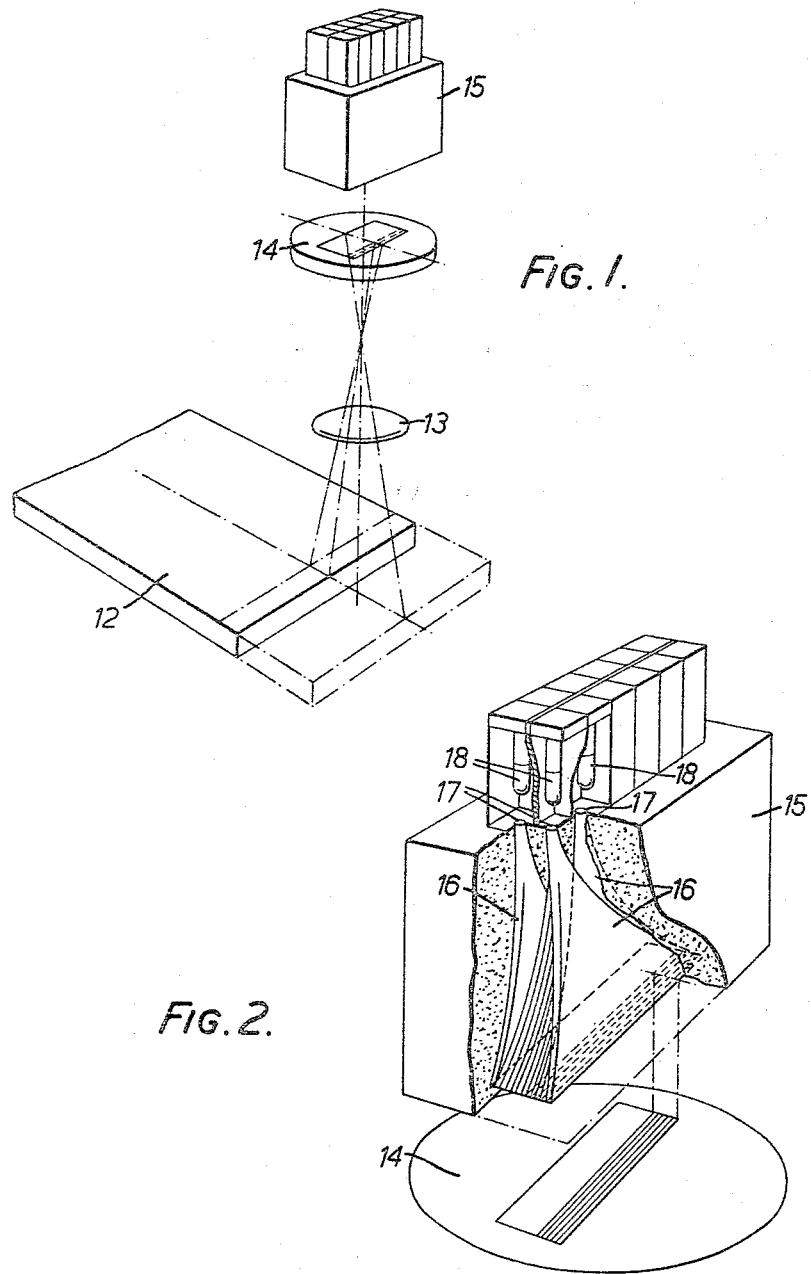

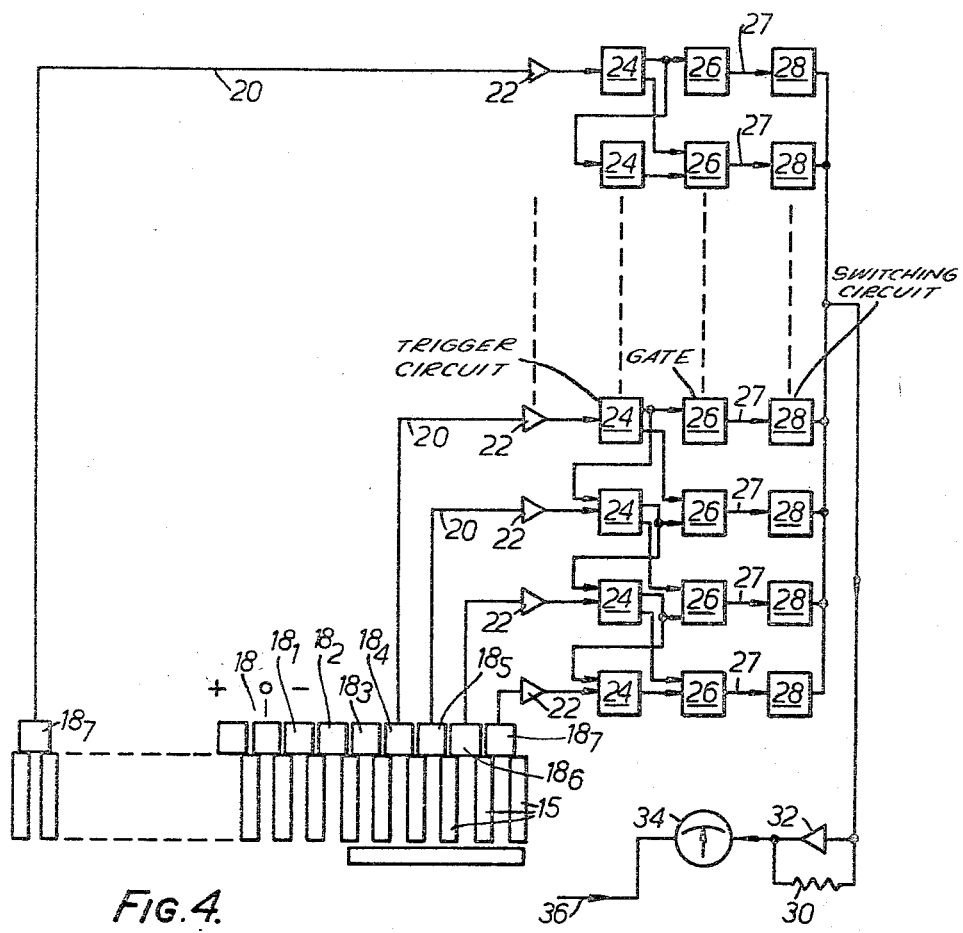

3,311,749
RADIATION SENSITIVE POSITION DETECTING AND LENGTH MEASURING APPARATUS
Peter Richard Ashworth Briggs, Sheffield, England, assignor to Davy and United Instruments Limited, Yorkshire, England
Filed Mar. 9, 1964, Ser. No. 350,380
Claims priority, application Great Britain, Mar. 13, 1963, 9,868/63
4 Claims. (Cl. 250—219)

This invention relates to a position detecting device and length measuring apparatus using electro-magnetic radiation-responsive means.

For determining the position of a radiation-transmitting element, such as a red hot sheet, slab, strip or plate, a lens system may be arranged so as to focus onto a given field of view the leading or trailing end, or the side of the object to be located. The position of this edge may then be determined by arranging a series of radiation-responsive devices such as photo-cells, in an array in the field of view of the optical system, but, because such devices have substantial finite size, they cannot normally be located sufficiently close together to enable the position of the edge of the object to be determined with sufficient accuracy.

This invention makes use of elongate radiation-transmitting elements, which can transmit radiation received at one end to the other end by multiple internal reflections on the walls of the elements. For example, the elements may be glass fibre elements arranged to transmit radiation in this way. The elements need not necessarily be kept straight, but can be bent to suit requirements, especially when the elements are flexible as in the case of glass fibre elements.

According to the present invention a position detecting device comprises a series of elongate radiation-transmitting elements each adapted to transmit radiation along its length by multiple internal reflections, the receiving end of each element being of elongate cross-section, and the receiving ends of the elements being arranged in an array with their long sides parallel to and closely adjacent one another, and the other ends of the elements being mounted individually adjacent a series of radiation dectors, such that radiation transmitted by any one element actuates a unique detector.

The present invention applies a pair of such position detecting devices to the measurement of the width or the length of a moving object, such as slab or plate issuing from a rolling mill. In this application a pair of positioning detecting devices are spaced apart a known distrance in the direction of the dimension to be measured, the detectors of each device are arranged to give a signal indicative of detected presence or absence of the object, and computing means responsive to the signals from the detectors are arranged to determine the dimension being measured.

Preferably an optical system is included, arranged to focus the edge of an object whose position is being measured onto the receiving ends of the elements of the position detecting devices.

The invention will be more readily understood by way of example from the following description of a position detecting device and length measuring apparatus, in accordance with the invention, reference being made to the accompanying drawings of which:

FIGURE 1 is a perspective view of a detecting system,

FIGURE 2 is a view on enlarged scale and partly broken away of the system of FIGURE 1, FIGURE 3 is a diagrammatic view of a detecting system as used for detecting the width of an object; and FIGURE 4 illustrates schematically an electrical circuit responsive to the detecting system shown in FIGURE 3.

The system shown in FIGURE 1 is designed to detect the position of the leading edge of a hot metal plate 12, which emits infra-red radiation. A lens 13 is arranged to focus radiation from the plate 12 onto the receiving end of a radiation-transmitting device 15 which is positioned in the image plane 14 of the optical system, and which is shown in greater detail in FIGURE 2.

The radiation-transmitting device 15 consists of a series of radiation-transmitting elements 16, the lower receiving end of each of which has a width of 0.005 inch in the direction of the path of plate 12 and a breadth of about 1 inch transverse to that direction. The lower ends of the element 16 are arranged in a closely spaced array, with the long dimensions of the ends parallel to one another and closely spaced apart at 0.005 inch intervals. Each element 16 extends upwardly and converges progressively so that its upper end 17 has a narrow circular cross-section. Each element may consist of a large number of individual glass-fibre filaments, each of circular cross-section, the lower ends of which are spread out along the breadth of the lower end of the element in a substantially straight line form, and the upper ends of which are bunched together at the top to form the upper end 17.

The upper end 17 of each of the elements 16 terminates adjacent a corresponding photocell 18. The photocells 18 are mounted close to the upper end 17 in order to collect the maximum amount of radiation. In some cases, it may be desirable to place a lens or lenses between the upper ends 17 of the elements and the photocells 18. The photocells 18 are shown arranged in a rectangular array, but any convenient array can be used since the upper ends of the elements 16 can be arranged in any platen, and can be turned through any angle. Each photocell is arranged to receive radiation from a different part of the path of plate 12 and these photocells are energized by radiation at any time to indicate the position of the leading end of plate 12 at that time.

The resolution of the system is determined by the number of elements used to represent a given length and the accuracy by the accuravy of positioning of the elements.

The radiation-transmitting device 15 may equally well be used for the length or width measurement of any radiation emitting or radiation-obturating object.

For measuring the linear dimension between two substantially straight, parallel edges of an object, such as a plate, two position detecting devices 15, as described, are space dapart (at nominal width) in the direction of the dimension to be measured, the long sides of the receiving ends of the elements 16 of the devices 15 being arranged normal to the direction of the dimension to be measured.

Referring now to FIGURE 4, the centre of the image 12A is represented by the photocell $18_0$. To both the left and right of the photocell $18_0$ are arranged seven photocells $18_1$, $18_2$, . . . $18_7$ it being appreciated that the number of photocells used depends on the degree of accuracy required. If any of the photocells $18_1$, $18_2$, . . . $18_7$ to the right-hand side of photocell $18_0$ are OFF, then that material edge is below nominal, and if any of the photocells $18_1$, $18_2$, . . . $18_7$ to the left-hand side of photocell $18_0$ is ON then that material edge is above nominal value. As illustrated, no radiation would be passed by the elements 16 associated with the photocells $18_1$, $18_2$, $18_3$ and thus no signal would be passed by these photocells.

The output pulses from the photocells $18_3$, $18_4$, $18_5$, $18_6$, $18_7$ are passed via lines 20 to amplifiers 22, from which the pulses pass to individual trigger circuits 24 which are combined with AND gates 26 to form logic circuitry. This is arranged so that only one AND gate 26 has an output at any time and this is the one corresponding to the last photocell to be ON. In the example shown, it would correspond to photocell $18_3$. Each AND gate 26 feeds, via a line 27, a transistor switching circuit 28 which connects one of a series of resistors 30 to the input of an operational amplifier 32, from which the pulses pass to a meter 34 which will thus indicate the deviation, if any, from nominal width. Each AND gate 26 is connected, through the switching circuit 28, to an associated individual resistor 30, the resistors being weighted according to the detector number or position of the material edge.

Since there can be an output signal on only one AND gate, only one resistor is connected at any one time. The output from the operational amplifier 32 is therefore proportional to the last ON photocell unit 18 and hence to the material edge.

Identical equipment is used on the other edge, the pulses from the equipment being fed via line 36 to the meter 34, which will thus indicate the algebraic sum of the outputs of the two radiation-transmitting assemblies 15.

What we claim is:

1. A position detecting device comprising a series of elongate radiation transmitting elements, each element composed of a number of individual filaments, each of circular cross-section, the radiation receiving ends of which filaments are spread out into a substantially straight line and the other ends of which are bunched together, each adapted to transmit radiation along its length by multiple internal reflections, each element having a radiation receiving end of elongate cross-section, the receiving ends of the elements being arranged side by side with their long sides parallel to and closely adjacent one another, the long sides of the receiving ends of the elements arranged parallel to the edge to be detected so that the receiving ends of the elements receive light from the edge of the object, and a series of radiation detectors located adjacent the other ends of the elements, each detector being positioned to receive radiation from only one of said elements.

2. Apparatus for measuring the linear dimension between two substantially straight parallel edges of an object, comprising a pair of position detecting devices, each according to claim 1, spaced apart a known distance in the direction of the dimension to be measured, the receiving end of each element of each device being of substantially straight line form arranged normal to the direction of the dimension to be measured, the detectors of each device being arranged to give a signal indicative of detected presence or absence of the object and means responsive to the signals from the detectors for computing the dimension to be measured.

3. Apparatus according to claim 2 in which the receiving ends of the elements of the position detecting devices are arranged on either side of the path of a moving object, such as a slab, strip or plate, and the computing means are arranged to give a continuous measure of the width of the object.

4. Apparatus according to claim 2 in which the receiving ends of the elements of the position detecting devices are spaced apart along the path of a moving object, such as a slab or plate, with the long sides of the receiving ends substantially normal to the direction of movement of the object, and the computing means are arranged to give a measure of the length of the object.

References Cited by the Examiner
UNITED STATES PATENTS

| | | | |
|---|---|---|---|
| 3,002,283 | 10/1961 | Quinn et al. | 88—1 |
| 3,158,432 | 11/1964 | Arend et al. | 88—1 |
| 3,184,732 | 5/1965 | Haynes | 250—227 X |
| 3,232,201 | 2/1966 | Frank et al. | 88—1 |

WALTER STOLWEIN, *Primary Examiner.*